United States Patent [19]

Schettler-Köhler

[11] Patent Number: 5,507,519
[45] Date of Patent: Apr. 16, 1996

[54] MOTOR VEHICLE HAVING AN OCCUPANT PROTECTION DEVICE

[75] Inventor: Rolf-Werner Schettler-Köhler, Wolfsburg, Germany

[73] Assignee: Volkswagen AG, Wolfsburg, Germany

[21] Appl. No.: 849,505

[22] Filed: Mar. 11, 1992

[30] Foreign Application Priority Data

Mar. 20, 1991 [DE] Germany ............ 41 09 094.2

[51] Int. Cl.⁶ .................................. B60R 21/22
[52] U.S. Cl. ........................... 280/730.1; 280/735
[58] Field of Search .................... 280/728, 730, 280/735, 728 R, 728 A, 730 R

[56] References Cited

U.S. PATENT DOCUMENTS

| 3,100,548 | 8/1982 | Grobe | 280/728 |
|---|---|---|---|
| 3,672,699 | 6/1972 | DeWindt | 280/735 |
| 3,795,412 | 3/1974 | John . | |
| 3,981,520 | 9/1976 | Pulling | 280/730 |
| 5,072,966 | 12/1991 | Nishitake et al. | 280/730 A |
| 5,172,790 | 12/1992 | Ishikawa et al. | 280/730 A |

FOREIGN PATENT DOCUMENTS

| 2212190 | 9/1873 | Germany . | |
|---|---|---|---|
| 2041741 | 2/1972 | Germany | 280/730 A |
| 3100548 | 8/1982 | Germany | 280/728 |
| 4018470 | 12/1990 | Germany . | |
| 0281458 | 12/1991 | Japan | 280/730 |
| 0046837 | 2/1992 | Japan | 280/728 |

*Primary Examiner*—Paul N. Dickson
*Attorney, Agent, or Firm*—Brumbaugh, Graves, Donohue & Raymond

[57] ABSTRACT

To prevent occupants seated side by side from impacting each other in an accident, an air bag is arranged between the seating locations and below the seating surface so that it will expand upwardly upon actuation.

4 Claims, 2 Drawing Sheets

MOTOR VEHICLE HAVING AN OCCUPANT PROTECTION DEVICE

SPECIFICATION

Background of the Invention

This invention relate to motor vehicles having inflatable devices for protection of occupants in an accident.

U.S. Pat. No. 3,795,412 discloses a motor vehicle in which an envelope-like device equipped with vertically extendable hoses is mounted in the roof. In the event of an accident, the envelope-like device is moved downward around an occupant of the vehicle as well as his seat by inflation of the vertically-extendable hoses, causing the hoses to extend downwardly from the roof. Thus, the hoses serve primarily to produce a movement of the whole device downwardly so that the device suppresses movement of the occupant in horizontal directions. The envelope-like device is also capable of suppressing movement of the surrounded occupant toward an occupant sitting next to him. A major disadvantage of this device is that, because of the shortness of the available time and the variety of possible positions and attitudes of the occupant in his seat, there is no assurance that the envelope-like device described will have inserted itself properly into the space between the occupant and the side wall of the vehicle prior to contact between the side wall and the occupant during an accident. Furthermore, the safety harness systems having shoulder straps which are now conventional rule out the use of such a device surrounding the occupant on all sides.

German Offenlegungsschrift No. 40 18 470 describes a device designed to protect vehicle occupants in a lateral crash. In this case, an air bag is mounted in the seat back on the side toward an adjacent side wall so that, upon actuation, for example, by switch contacts in the side wall, the air bag will expand forwardly into the space between the seated occupant and the side wall. This device does not interfere with the use of conventional safety harness systems but it fails to take account of the fact that when several occupants are seated side by side, they may be thrown against each other by inertia forces so as to cause injuries in event of a side impact to the vehicle. Such inertia forces may also cause injuries to occupants seated in front of and behind each other in the event of a front or rear impact to the vehicle.

Summary of the Invention

Accordingly, it is an object of the present invention to provide an occupant protection device for a motor vehicle which overcomes the above-mentioned disadvantages of the prior art.

Another object of the invention is to provide a motor vehicle having an occupant protection device which does not restrict the freedom of motion of the vehicle occupants in normal conditions but affords safety from impact between occupants sitting side by side.

These and other objects of the invention are attained by providing a vehicle with an air bag normally stored between adjacent seat locations and below the level of the seats and arranged to expand upwardly between the seat locations upon inflation.

Thus, in the event of a crash providing impact in the direction between the seat locations, that is, in the event of a lateral impact on the vehicle assuming the usual arrangement of adjacent seating transverse to the direction of travel, an air bag is inflated so as to expand from below upwardly into the space between the seats. The invention, of course, is not limited to vehicles having individual seats, but may also be applied with the same advantage to vehicles having a plurality of seating locations on a common seat member, for example the back seat of a motor vehicle.

Since an air bag is employed rather than hoses which are inflated in their lengthwise direction to produce downward movement of a protective device as in the patent discussed above, the device of the invention assures a deformable cushion between occupants sitting side by side, so that a comparatively soft arrest of movement of the occupants relative to each other is achieved. The storage of the air bag below the seat surface, i.e. in the floor of the vehicle in the case of individual seats and in the bottom of the seat in the case of a bench seat, prevents the difficulty which can result from a bulky occupant, or one sitting diagonally so as to block the region in front of an air bag mounted in the seat back and prevent forward motion of such an air bag.

Since the occupant protection device according to the invention is intended to prevent contact between occupants sitting next to each other, its actuation is not required if, for example, only the driver's seat of a passenger car is occupied and there is no passenger in the seat beside him.

Actuation of the air bag may be accomplished in any conventional manner. For example, an inertia sensor may detect rapid deceleration of the vehicle, or contact bars may be provided on the sides of the vehicle as disclosed for example in German Offenlegungsschrift No. 22 12 190. Details of such actuation arrangements are therefore known to those skilled in the art and need not be described in detail.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
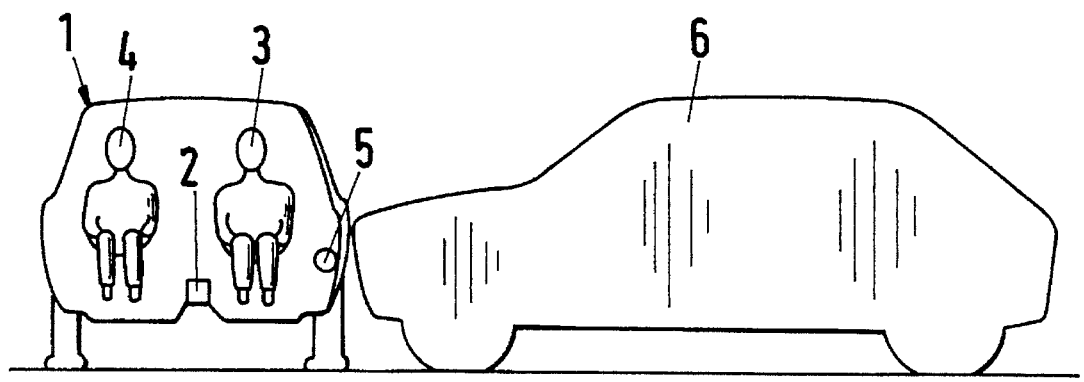
FIG. 1 is a schematic illustration of a representative embodiment of a motor vehicle arranged according to the invention shown just prior to side impact by another vehicle.

In the typical embodiment of the invention shown in FIG. 1, a motor vehicle 1 is equipped with an air bag 2 stored in the space between seats holding two occupants 3 and 4. On the side walls of the vehicle, collision sensors such as contact bars are provided, only one such contact bar 5 being shown in the drawing on the side wall toward a colliding vehicle 6. It will be noted that the air bag 2 does not restrict freedom of movement of the occupants 3 and 4 in transverse direction prior to an accident.

Figure 2:
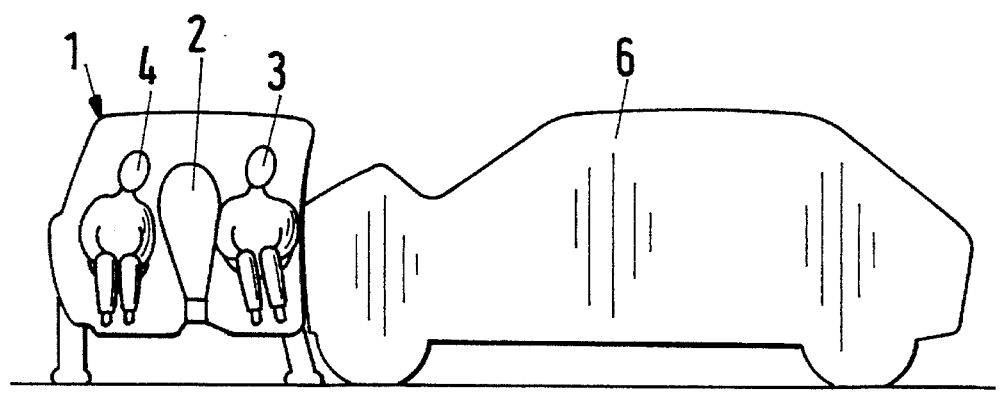
FIG. 2 is a schematic illustration similar to FIG. 1 showing the motor vehicle just after side impact by another vehicle.

As soon as the collision sensor 5 is closed by impact of the colliding vehicle 6, an actuating contact for the air bag is closed. In the example shown in FIG. 2, such contact requires a deformation of the side wall facing the colliding vehicle 6. When the contact closes, the air bag is inflated and expands from below the seats upwardly into the space between the occupants 3 and 4 as shown in FIG. 2 so that it will cushion contact between the occupants resulting from inertia forces.

Figure 3:
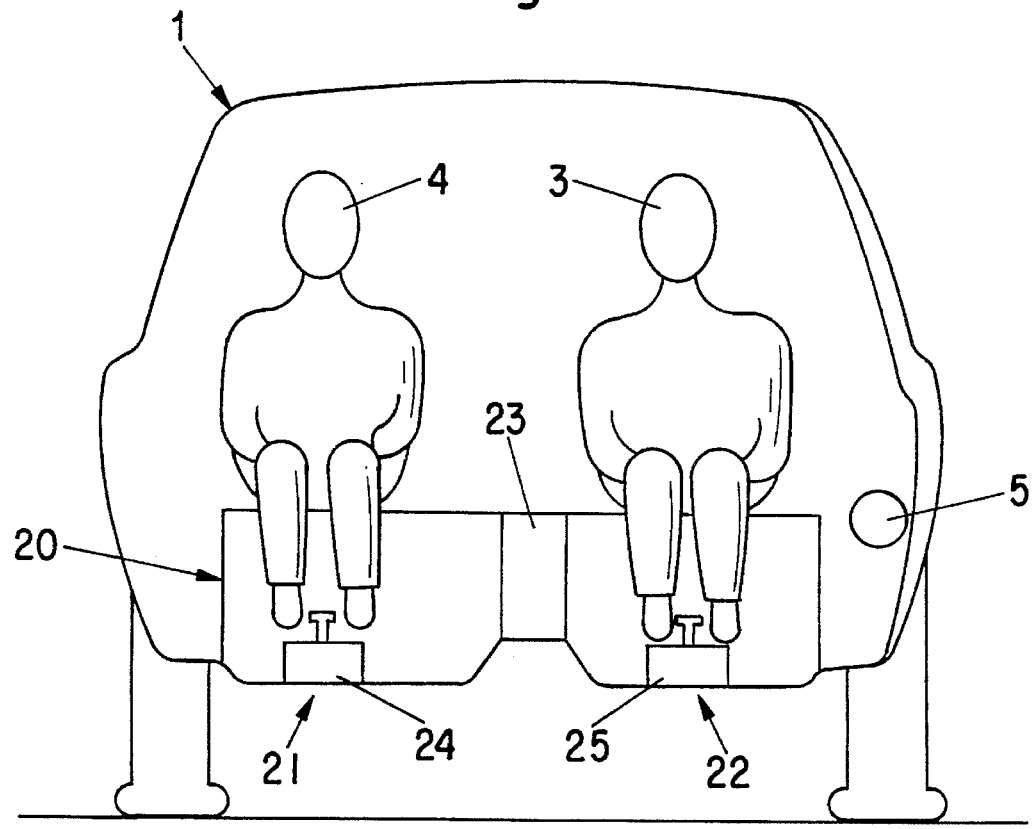
FIG. 3 is a schematic illustration similar to FIG. 1 showing a motor vehicle having an air bag stored in a bench seat in accordance with the invention.
Figure 4:
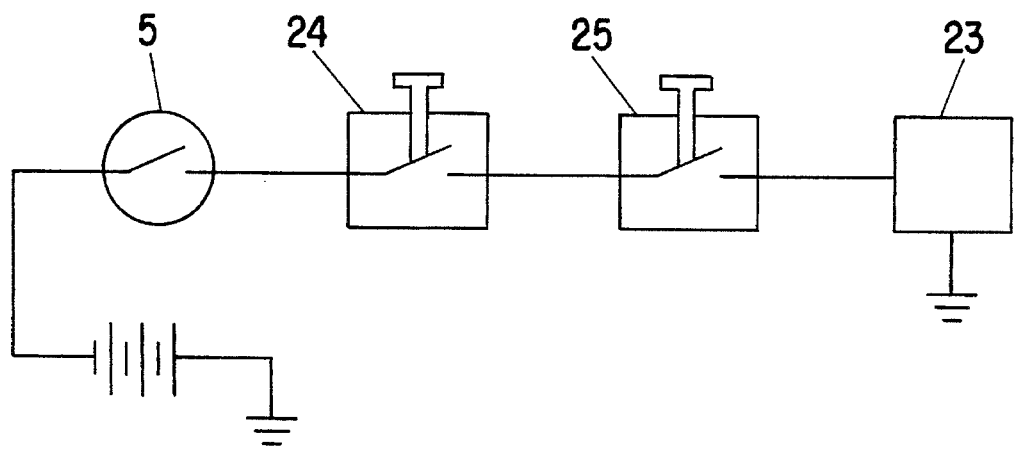
FIG. 4 is a schematic circuit diagram showing a conventional actuating circuit for actuating the air bag shown in FIGS. 1–3 in response to deformation of a side wall of the vehicle.

FIG. 3 illustrates schematically an arrangement in which the adjacent seats are part of a bench seat and the air bag is stored in the bench seat between the seat locations. In this arrangement, a conventional bench seat 20 for a motor vehicle has adjacent seat locations 21 and 22 for two occupants 3 and 4 sitting side-by-side. An air bag 23 stored between the two seat locations 21 and 22 and below the level of the seat locations is arranged to be inflated only when both seat locations 21 and 22 are occupied as detected by conventional switch arrangements 24 and 25 disposed beneath the occupants of the seat locations 21 and 22, respectively. FIG. 4 illustrates schematically an actuating circuit for the air bag and a seat switch arrangement permitting completion of the circuit only when both adjacent seats are occupied. In this arrangement, a conventional circuit for actuating the air bag 23 of the type disclosed, for example, in the De Windt Patent No. 3,672,699, actuates the air bag in response to closing of the switches 24, 25 and 5.

The invention thus provides a motor vehicle with an occupant protection device which affords safety against dangerous impact between occupants sitting side by side during an accident.

Although the invention has been described herein with references to specific embodiments, many modifications and variations therein will readily occur to those skilled in the art. Accordingly, all such variations and modifications are included within the intended scope of the invention.

I claim:

1. In a motor vehicle having occupant seat locations adjacent to each other, a protection device for occupants of adjacent seat locations comprising an air bag stored between the adjacent seat locations and disposed entirely below the seating level of the seat locations and arranged to expand upwardly from below the seating level of the seat locations to extend between occupants of the seat locations upon inflation.

2. A motor vehicle according to claim 1 wherein the adjacent seat locations are separated and the air bag is stored on the vehicle floor.

3. A motor vehicle according to claim 1 wherein the adjacent seat locations are part of a bench seat and the air bag is stored in the bench seat between the seat locations.

4. A motor vehicle according to claim 1 including an actuating circuit for the air bag and a seat switch arrangement permitting completion of the circuit only when both adjacent seat locations are occupied.

* * * * *